United States Patent [19]

Mazeau et al.

[11] 4,282,021

[45] Aug. 4, 1981

[54] METHOD OF MAKING PHOTOCHROMIC GLASSES SUITABLE FOR SIMULTANEOUS HEAT TREATMENT AND SHAPING

[75] Inventors: Jean P. Mazeau, Avon, France; Thomas P. Seward, III, Corning, N.Y.

[73] Assignee: Corning Glass Works, Corning, N.Y.

[21] Appl. No.: 88,546

[22] Filed: Oct. 26, 1979

Related U.S. Application Data

[60] Continuation of Ser. No. 947,502, Oct. 2, 1978, abandoned, which is a division of Ser. No. 895,646, Apr. 12, 1978, Pat. No. 4,130,437.

[51] Int. Cl.$^3$ ................................................ C03C 3/26
[52] U.S. Cl. ........................................ 65/30 R; 65/37; 65/DIG. 2; 106/47 Q; 106/53
[58] Field of Search ................. 65/DIG. 2, 30 R, 37; 106/47 Q, 53, DIG. 6

[56] References Cited

U.S. PATENT DOCUMENTS

| | | | |
|---|---|---|---|
| 3,338,696 | 8/1967 | Dockerty | 65/145 |
| 4,018,965 | 4/1977 | Kerko et al. | 65/DIG. 2 |
| 4,088,470 | 5/1978 | Bourg et al. | 65/DIG. 2 |

*Primary Examiner*—Arthur D. Kellogg
*Attorney, Agent, or Firm*—Clinton S. Janes, Jr.

[57] ABSTRACT

The instant invention is related to the manufacture of photochromic glasses having base compositions within a very narrow interval of the alkali metal boroaluminosilicate system wherein silver chloride and/or silver bromide crystals impart photochromic properties. The glasses are notable for their rapid fading characteristics and relatively low temperature dependence of darkening. The compositions are especially suitable for a production process which contemplates simultaneously shaping articles from glass sheet and developing photochromic properties therein.

4 Claims, No Drawings

METHOD OF MAKING PHOTOCHROMIC GLASSES SUITABLE FOR SIMULTANEOUS HEAT TREATMENT AND SHAPING

This is a continuation of application Ser. No. 947,502, filed Oct. 2, 1978, now abandoned, which is a division of application Ser. No. 895,646, filed Apr. 12, 1978, now U.S. Pat. No. 4,130,437.

BACKGROUND OF THE INVENTION

The field of photochromic glasses is founded in U.S. Pat. No. 3,208,860 which discloses the production of silicate-based glasses that exhibit darkening when exposed to actinic radiation, customarily ultraviolet radiation, and which return to their original color when removed from the source of actinic radiation. Such reversible optical properties are achieved via the incorporation of effective amounts of silver and at least one halide of the group chloride, bromide, and iodide into the glass composition which combine to form silver halide crystallites in the glass. The crystallites are so small as to be invisible to the unaided eye, yet are darkenable under the action of actinic radiation to reduce the optical transmittance of the glass. When the actinic radiation is extinguished, the crystallites fade to their original state, thereby restoring the optical transmittance to its initial level. This cycle of darkening and fading can be repeated indefinitely without fatigue in photochromic glasses.

By far the most prevalent use for photochromic glasses has been in the fabrication of ophthalmic lenses. One example of that application is provided in U.S. Pat. No. 3,197,296 which describes a family of refractive index-corrected silicate glasses containing silver halide crystals to provide the desired photochromic behavior. Those glasses demonstrated, in conventional 2 mm thickness, photochromic properties sufficiently developed for prescription ophthalmic applications along with the necessary refractive index to be compatible with conventional lens grinding practices.

The manufacture of ophthalmic lenses commonly involves the pressing of glass lens blanks of optical quality from a melt followed by the grinding and polishing of the blanks to predetermined prescriptions. It is believed self-evident that the production of non-prescription photochromic glass lenses, for example, sunglass lenses, in large quantities by processes demanding grinding and polishing is not only expensive and time consuming, but is also wasteful of material. Consequently, less costly means for producing photochromic glass sheet for lenses or other applications would be highly desirable. Assuming that the sheet could be produced in optical quality, the sheet could be inexpensively thermally sagged to the curvatures required for lenses, windshields, and other sheet glass configurations.

The commercial sheet glass forming processes practiced today contemplate maintaining substantial volumes of molten glass at temperatures wherein the glass has the necessary viscosity for sheet forming, viz., at a viscosity between about $10^4$–$10^6$ poises. By the very nature of the drawing process, those volumes of glass are in prolonged contact with refractory metals or ceramics which serve as the means for forming drawn sheet. Thus, the sheet drawing processes impose severe constraints upon glass composition because of the formidable liquidus and glass stability problems associated with the handling and processing of glass at relatively low temperatures and high viscosities.

In addition to good formability properties, suitable glass sheet for ophthalmic purposes will exhibit high optical quality, good chemical durability, high strength, and good photochromic darkening even in sheet of moderate thickness. Where the sheet is scheduled for use as lightweight sunglass lenses, the glass must also be chemically strengthened such as to meet the Food and Drug Administration (FDA) requirements for eyeglass lens safety. Federal safety requirements cannot be routinely met in lightweight glass of moderate thicknesses (1.3–1.7 millimeters) in the absence of chemical strengthening, or by utilizing an air tempering procedure. U.S. Pat. No. 4,018,965 describes a group of glass compositions which demonstrates the properties necessary for photochromic sheet glass applications.

From the considerable experience gained through the years in the manufacture of photochromic glasses suitable for ophthalmic applications, the following several criteria have been formulated therefor as goals to achieve in the production of sunglasses; these criteria being in addition to the necessary melting, forming, and chemical strengthening capabilities, as well as the physical characteristics conventionally demanded in non-photochromic ophthalmic ware.

First, a glass which in 1.5 mm thickness at room temperatures (25°–30° C.) will exhibit an optical transmittance in the range of 60–90% before exposure to actinic radiation but which, when irradiated with actinic radiation, e.g., bright outdoor sunlight, will darken to a transmittance of less than 30%.

Second, a glass which in 1.5 mm thickness at 25°–30° C. will fade very rapidly when removed from the incident actinic radiation; i.e., the glass within five minutes will fade to a transmittance of about two times its darkened transmittance and within an hour will fade to a transmittance of at least 80% of its original transmittance.

One circumstance which must be kept in mind when conducting research involving photochromic glass is the fact that the dynamics of photochromic behavior exhibited by glasses are directly related to the intensity of the actinic radiation impinging thereon and the temperature of the glass while being irradiated. Accordingly, where other parameters are held constant, a photochromic glass will customarily darken to a lower transmittance when exposed to actinic radiation while at a lower temperature. Moreover, the intensity of solar radiation can obviously vary greatly depending upon the season of the year, the location of the exposure (angle of declination of the sun), cloud cover, snow cover, air mass value, etc.

With respect to temperature dependence, i.e., the degree of darkening demonstrated by a photochromic glass over a range of ambient temperatures, some photochromic glasses in 1.5 mm thickness may darken to a transmittance of less than 5% when subjected to solar radiation at a temperature of −18° C. (0° F.). Such glasses would not comply with the specifications of the American National Standards Institute (ANSI) which specify lenses for general use as fixed tint sunglasses to exhibit an optical transmittance of at least 5%.

Consequently, a third criterion proposed for photochromic glasses which are to be used for ophthalmic applications is that in 1.5 mm thickness the glass will not darken to a transmittance of less than 5% at −18° C.

The converse of the above-stated rule regarding temperature dependence also holds true; viz., where other parameters are maintained constant, a photochromic glass will darken to a lesser degree, i.e., the final darkened optical transmittance will be higher, when the glass is at a higher temperature when exposed to actinic radiation. To have practical utility as a sunglass, it has been deemed that a photochromic glass should darken to an optical transmittance of less than 50% when exposed to outdoor sunlight at temperatures encountered during summer.

Accordingly, a fourth criterion which has been proposed is that a photochromic glass in 1.5 mm thickness will darken to a transmittance less than 50% when exposed to actinic radiation at 40° C. (104° F.).

Finally, to simplify manufacturing techniques, while concomitantly maintaining the optical properties of the pristine glass surface, the ideal glass compositions would permit the desired photochromic properties to be developed concurrently with the required lens curvature during a thermal sagging operation. U.S. application Ser. No. 773,958, filed Mar. 3, 1977 in the names of Bourg, Hazart, and Jouret now U.S. Pat. No. 4,088,470, discloses such a technique for simultaneously heat treating and sagging sheet of photochromic glass into lens blanks of a desired curvature.

It is believed apparent from the prior art that the photochromic properties exhibited by a particular glass are dependent upon both composition and the heat treatment to which it is subjected. The curvature secured in a thermal sag cycle is also a function of such parameters as glass composition and incident thermal cycle resulting through the combined effects of surface energy, density, and viscosity, this latter factor being strongly dependent upon temperature. A most fortuitous circumstance would exist where the desired photochromic behavior could be achieved through the same heat treatment as that giving rise to the necessary lens curvature.

Therefore, a fifth criterion proposed is a glass capable of being concurrently heat treated and sagged to simultaneously yield the desired lens curvature and photochromic properties.

U.S. application Ser. No. 887,677, filed Mar. 17, 1978 by G. B. Hares, D. L. Morse, D. W. Smith, and T. P. Seward, III, now abandoned and refiled Feb. 28, 1979 as U.S. application Ser. No. 14,981, now U.S. Pat. No. 4,190,451 discloses a silver halide-containing, silicate photochromic glasses exhibiting quite rapid fading characteristics and relatively low temperature dependence of darkening. Several of the compositions recited in that application are operable for sheet drawing processes but are not suitable for a simultaneous heat treating-sagging procedure, such as has been described above. The inapplicability of those glasses for such a process resides in the fact that the times and temperatures demanded to sag the glass sheet are such as to cause the glass to sag into contact with formers which produce the necessary lens curvature, this contact causing the destruction of the good optical properties of the pristine surface. Yet, without such formers, those glasses would sag to a much higher curvature than desired. Thus, the lens blanks fabricated from those glass compositions via a heat treating-sagging technique would require grinding and polishing to provide the required optical quality surface.

OBJECTIVE OF THE INVENTION

The principal objective of the instant invention is the manufacture of transparent photochromic glass which, in sheet form, will be suitable for the fabrication of sunglasses through a heat treating-sagging process and which, in 1.3–1.7 mm thicknesses, manifests the following photochromic and physical properties:

(a) at about 25°–30° C., the glasses will darken to a luminous transmittance below 30% in the presence of actinic radiation, e.g., bright outdoor sunshine; the glasses will fade to a luminous transmittance at least 1.75 and, preferably, two times the darkened transmittance after five minutes' removal from the actinic radiation; and the glasses will fade to a luminous transmittance in excess of 80% of their original undarkened transmittance in no more than one hour after being removed from the actinic radiation;

(b) at about 40° C., the glasses will darken to a luminous transmittance below 50% in the presence of actinic radiation, e.g., bright outdoor sunshine, and will fade to a luminous transmittance in excess of 80% of their original undarkened transmittance in no more than one hour after being removed from the actinic radiation;

(c) in the undarkened state, the glasses will exhibit a luminous transmittance (clear luminous transmittance) of at least 60%, conveniently obtained by incorporating a fixed tint in the composition, but more typically within the range of 85–92%;

(d) at about $-18°$ C., the glasses will not darken to a luminous transmittance below 5% in the presence of actinic radiation, e.g., bright sunlight;

(e) the glasses are capable of being strengthened via either thermal tempering or chemical strengthening while maintaining the desired photochromic properties; and (f) the glasses in sheet form have the capability of being simultaneously heat treated and sagged to produce lens blanks of the proper curvature with the desired photochromic properties.

SUMMARY OF THE INVENTION

In the most general terms, the glass compositions operable in the present invention consist essentially, in weight percent on the oxide basis as calculated from the batch, of about 54–66% $SiO_2$, 7–15% $Al_2O_3$, 10–25% $B_2O_3$, 0.5–4.0% $Li_2O$, 3.5–15% $Na_2O$, 0–10% $K_2O$, 6–16% total of $Li_2O+Na_2O+K_2O$, 0–1.25% PbO, 0.10–0.3% Ag, 0.2–1.0% Cl, 0–0.3% Br, 0.002–0.02% CuO, and 0–2.5% F. The glass may optionally additionally contain colorant oxides selected in the indicated proportions from the group consisting of 0–1% total of transition metal oxide colorants and 0–5% total of rare earth oxide colorants.

Glasses produced from the above-described compositions exhibit viscosities of at least about $10^4$ poises at the liquidus temperature, thereby providing a liquidus-viscosity relationship permitting forming via direct sheet drawing from the melt. The glasses also demonstrate long term stability against devitrification in contact with platinum at temperatures corresponding to glass viscosities in the range of $10^4$–$10^6$ poises, and, hence, can be drawn from a melt at those viscosities utilizing platinum or platinum-clad drawbars, downdraw pipes, or other sheet forming means to yield glass sheet of optical quality. As defined herein, long term stability against devitrification comprehends good resistance to surface crystal growth in contact with platinum at temperatures corresponding to glass viscosities in the $10^4$–$10^6$ poise range. The growth of a crystalline layer not exceeding 10 microns in thickness at the glass-platinum interface over a contact period of 30 days at those viscosities is considered good resistance to crystal growth.

The inventive glasses also display excellent chemical durability, by which is meant that the glasses manifest no visible surface film formation or iridescence following a 10-minute exposure at 25° C. to 10% by weight aqueous HCl.

Glasses within the above-recited composition area are capable of being chemically strengthened to modulus of rupture values in excess of about 45,000 psi with a depth of ion-exchanged layer of at least 0.0035", as determined by conventional stress layer examination techniques employing, for example, a polarizing microscope equipped with a Babinet compensator. Such strength and compression layer characteristics can be secured through conventional sodium-for-lithium salt bath ion exchange processes at normal ion exchange temperatures (300°–450° C.), the surface compression being generated by the replacement of $Li^+$ ions in the glass surface with the larger $Na^+$ ions of the molten salt. Such physical properties permit glass sheet of 1.3–1.7 mm thickness to readily pass the Food and Drug Administration impact test for ophthalmic lenses (the drop of a $\frac{5}{8}$" steel ball from a height of 50").

Finally, glasses within the inventive composition region exhibit an excellent combination of photochromic properties following heat treatment in accordance with conventional practice. These properties include, in glass sheet not exceeding about 1.7 mm thickness, a darkened luminous transmittance of less than 30% at 25°–30° C., a luminous transmittance after five minutes' removal from actinic radiation of at least 1.75 and, preferably, two times that of the darkened state, and a luminous transmittance after one hour's removal from actinic radiation of at least 80% of their original undarkened transmittance. Upon exposure to actinic radiation at $-18°$ C., the luminous transmittance of the glasses will not fall below 5%. At 40° C., exposure to actinic radiation will darken the glasses to below 50% transmittance and the glasses will fade to a luminous transmittance in excess of 80% of their original undarkened transmittance.

For the purposes of the present description, the luminous transmittance of a glass is defined as the value Y delineated in terms of the 1931 C.I.E. trichromatic colorimetric system utilizing the light source Illuminant C. This colorimetric system and light source are described by A. C. Hardy in the *Handbook of Colorimetry*, Technology Press, M.I.T., Cambridge, Massachusetts (1936). Also, as employed in this disclosure, the clear or undarkened state is obtained via an overnight (at least 8 hours) fading of the glass in the absence of light. A slightly clearer glass (2–3 percentage transmittance units higher) can be secured by submerging the glass in boiling water for five minutes.

Glass designed for sunglass lens applications will preferably exhibit a clear luminous transmittance of at least about 60%, this value being readily obtainable in the inventive glasses in combination with the other desired photochromic properties. Darker glasses having clear luminous transmittances of less than 60%, however, can be achieved within the inventive glass composition interval where maximum or near maximum concentrations of the cited colorants are included.

The method of the instant invention comprises an improved process for the production of drawn photochromic glass sheet wherein a glass-forming batch is melted, the melt adjusted in temperature to provide a viscosity of $10^4$–$10^6$ poises, and then drawn past refractory forming means within that range of viscosities to yield potentially photochromic glass sheet. As used herein, potentially photochromic glass sheet is defined as glass sheet including silver halides and sensitizing agents or activators such as copper oxide which can be rendered photochromic via an appropriate heat treatment after the forming step. The glass sheet can be formed utilizing conventional updraw or downdraw processes.

Observance of the inventive compositional and process parameters, coupled with supplemental heat treatments and strengthening procedures involving conventional time-temperature schedules, permits the production of chemically strengthened photochromic drawn sheet glass articles which can be especially suitable for the fabrication of thin, lightweight photochromic ophthalmic or sunglass lenses. Most importantly, the above-described compositional and process parameters enable the potentially photochromic sheet to be rendered photochromic during a heat treatment schedule designed to produce sagged lenses for ophthalmic or sunglass applications. Thus, the imparting of photochromic behavior to the glass and the sagging thereof to the proper curvature are accomplished in the same heat treatment.

DESCRIPTION OF THE PREFERRED EMBODIMENTS

Inasmuch as the chemical, photochromic, and physical properties, along with sagged lens curvatures (when required), are complex functions of the several constituents of the glass composition, strict adherence to the compositional limitations of the inventive glasses is vital to achieving the desired combination of properties.

As was observed in U.S. Pat. No. 4,018,965, supra, the presence of $Li_2O$ is demanded in the glass composition to secure the capability of being chemically strengthened. Hence, where less than about 0.5% by weight $Li_2O$ is present in the composition, modulus of rupture values in excess of about 45,000 psi and depth of compression layers of 0.0035" cannot be consistently obtained. On the other hand, $Li_2O$ contents in excess of 4% by weight give rise to decreased glass stability against platinum metal when the molten glass has a viscosity within the $10^4$–$10^6$ poise interval, and hazards the development of haze in the glass. The desired mechanical strength and depth of compression layer cannot be attained in the absence or near-absence of $Li_2O$ employing, for example, a $K^+$-for-$Na^+$ ion exchange treatment to strengthen the glass.

Control must be maintained over the levels of the other alkali metal oxides because of their effect upon both photochromic and chemical strengthening characteristics. For example, where less than the stated concentrations of $Na_2O$ and $K_2O$ are present, photochromic darkenability and the capacity for chemical strengthening are impaired. Quantities of alkali metal oxide greater than the total specified act to reduce the fading rate of the glass and $K_2O$ in excess of the stated limit seems to reduce the chemical strengthening potential of the glass.

The presence of $Al_2O_3$ and $B_2O_3$ in the composition appears to counter the adverse effect upon fade rate exercised by the alkali metal oxides. Hence, glasses containing less than the recited amounts of those components will generally demonstrate inferior photochromic behavior. The inclusion of more than about 25% by weight $B_2O_3$, however, tends to decrease the chemical durability of the glass. Where more than about 15% by weight $Al_2O_3$ is employed, the glass stability against devitrification is substantially degraded, the excess $Al_2O_3$ being prone to combine with the $Li_2O$ of the composition to produce spodumene solid solution crystals.

The presence of lead oxide in the specified range can be of great significance in providing the desired combination of photochromic properties in the glass, particularly with regard to the amount of darkening and the fade rate, as will be discussed in more detail infra.

The addition of minor amounts of compatible constituents to the glass composition is permissible but is generally avoided because of the possibility of adversely affecting the desired combination of photochromic and physical characteristics. Accordingly, whereas alkaline earth and other multivalent metal oxides may be included, no substantive property advantages have been perceived in so doing and, frequently, such additions tend to increase the liquidus temperature and decrease the long term stability of the glass. Minor amounts of the alkali metal oxides $Rb_2O$ and $Cs_2O$ may be added, but such appear to impair the chemical strengthening potential of the glass.

$TiO_2$ and $ZrO_2$ will preferably be entirely absent due to their known function as a nucleating agent for crystal growth. As little as 0.8% $ZrO_2$ can promote zircon crystallization at temperatures in the glass forming range.

Additions of $SnO_2$, $Sb_2O_3$, and/or $As_2O_3$ may be useful in modifying the characteristics of the glass melt, particularly with regard to the oxidation state thereof.

As has been disclosed above, lead oxide can play an important role in controlling photochromic properties. Improved darkening of the glass is secured when PbO is present in an amount of at least 0.15%. The fastest fading glasses contain PbO in levels less than about 0.7% by weight.

A very significant facet of the instant invention is the discovery that copper at concentrations of 0.002–0.020% by weight CuO can play a meaningful part in achieving low temperature dependence of darkening without degradation in fade rate. Consequently, when the composition of the base glass is changed to modify the physical properties thereof, and, in so doing, the content of PbO or alkali metal oxide is increased, an increased amount of copper will be required to achieve the optimum combination of darkening, fading, and low temperature dependence.

Where a simultaneous heat treat-sag processing step constitutes an element in the line of production, silver and bromide, as analyzed in the glass, should fall within the indicated ranges of 0.12–0.18% and 0.060–0.13%, respectively. Smaller amounts of Ag and Br do not provide sufficient nucleation and, as a result, the glasses tend to be hazy and darken poorly. With greater quantities of Ag and Br, nucleation is excessive and the glasses do not darken well when heat treated for only the short periods of time required to give good sagged lens curvature.

Good darkening character has been found consistent with high chloride concentrations. Thus, Cl levels greater than 0.2% and, preferably, in excess of 0.3% by weight are required. Nevertheless, because high chloride contents appear prone to increase the temperature dependence of the glass somewhat, discretion dictates that the chloride concentrations be kept at such low levels as is practically consistent with good darkenability.

The inventive glass compositions can be compounded from conventional glass bath constituents in proportions that will yield the desired oxide components in the proper amounts at temperatures utilized for melting the glass. The melting may be undertaken in accordance with conventional optical glass melting practice in crucibles, pots, tanks, or other melting units at temperatures within the 1200°–1550° C. interval.

The molten glass may be formed utilizing any of the techniques known to the glassmaking art such as blowing, casting, pressing, rolling, and spinning. Moreover, the glass is sufficiently stable that it may also be formed into sheet by direct drawing from the melt, at least where platinum or other refractory metal-lined drawbars, downdraw troughs, or other forming means are utilized.

The glass sheet or other articles may then be heat treated in accordance with thermal schedules conventional for photochromic glasses in order to develop the desired photochromic behavior therein. Thus, operable heat treatments contemplate exposure of the glass sheet to temperatures within the range of 580°–750° C. for times ranging from a few seconds to a few hours. To insure the required optical surface quality, the glass will be supported in a manner calculated to preclude surface marking as, for example, via edge support means.

Where the glass will be sagged to the desired lens curvature and the photochromic properties developed simultaneously during the same heat treatment, temperatures between about 610°–640° C. for periods of time between about 6–15 minutes or about 640°–660° C. for about 5–12 minutes have been found suitable. Lens curvatures of about 4–6 diopters in 60–80 mm diameter lenses have been developed.

Finally, after the photochromic properties have been generated, the glass articles can be subjected to conventional chemical strengthening treatments; for example, immersion in a bath of molten $NaNO_3$ or a bath of molten $NaNO_3 + KNO_3$ containing at least 30% by weight of $NaNO_3$. The desired strength and depth of compression layer can be attained where the immersion is conducted for about 4–24 hours in baths at temperatures between about 300°–450° C.

The most optimum combination of photochromic and physical properties, wherein lenses are simultaneously sagged to the required curvatures and photochromic properties are developed therein, and those lenses are subsequently chemically strengthened without substantial impairment of the photochromic properties, is produced within a preferred group of glasses having compositions consisting essentially, in weight percent on the oxide basis as calculated from the batch, of about 57.1–65.3% $SiO_2$, 9.6–13.9% $Al_2O_3$, 12.0–22.0% $B_2O_3$, 1.0–3.5% $Li_2O$, 3.7–12.0% $Na_2O$, 0–5.8% $K_2O$, 6–15% total of $Li_2O + Na_2O + K_2O$, a molar ratio of $Li_2O:Na_2O + K_2O$ not exceeding about 2:3, 0–1.25% PbO, 0.12–0.24% Ag, 0.2–1.0% Cl, 0.06–0.25% Br, 0–2.5% F, 0.002–0.020% CuO, 0–1.0% total of transition metal oxides selected in the indicated proportions from the group consisting of 0–0.5% CoO, 0–1.0% NiO, and 0–1.0% $Cr_2O_3$, and 0–5.0% total of rare earth metal oxides selected from the group consisting of $Er_2O_3$, $Pr_2O_3$, $Ho_2O_3$, and $Nd_2O_3$.

Specific examples of preferred glass compositions falling within the above ranges are reported in Table I below. The individual components are expressed in parts by weight on the oxide basis as calculated from the batch, except that the halides and silver are tabulated on an elemental basis in accordance with customary glass analysis practice. Analyzed values are also recorded for Ag, Br, and Cl since it is the retained concentrations of those ingredients which are critical to the invention. The values to the left of the slash mark represent batch content and those to the right of the slash mark analyzed levels. Wet chemical and X-ray emission techniques were employed in those analyses. Inasmuch as the sum of the several ingredients approximates 100, for all practical purposes the values reported can be deemed to represent weight percent.

Each of the glasses within the above range of preferred compositions, including the specific examples of Table I, has a viscosity at the liquidus of at least $10^5$ poises, as well as excellent chemical durability as characterized by essential inertness in the above-described acidic solutions. The glass also demonstrates long term stability against devitrification in that it manifests good resistance to crystallization when in contact with platinum at viscosities within the $10^4$–$10^6$ poise range. Furthermore, all of the preferred glasses are capable of being chemically strengthened to modulus of rupture values of at least 45,000 psi with a depth of compression layer of at least 0.0035", utilizing conventional ion exchange strengthening techniques.

Table I also includes photochromic property data measured on individual samples at 27° C., 40° C., and −18° C., wherein $Y_o$ indicates the clear luminous transmittance of the glass, $Y_{10}$ and $Y_{20}$ represent the darkened luminous transmittances of the glass after 10 and 20 minutes' exposure, respectively, to actinic radiation, and $Y_{F5}$ reports the luminous transmittance of the darkened glass after a five-minute removal from the actinic radiation.

In the past an ultraviolet lamp has been used as a convenient source of actinic radiation to test the photochromic characteristics of glass samples, since it was recognized that photochromic glasses were primarily activated by radiations in the ultraviolet and low visible portions of the spectrum. It has been found, however, that frequently the correlation between the data obtained with the ultraviolet lamp and the values measured from solar radiation outdoors was poor. Consequently, in order to secure better correlation with outdoor solar exposure, a "solar simulator" was devised for the determination of the luminous transmittance Y in Table I.

The solar simulator apparatus, as described in U.S. application Ser. No. 839,496, filed Oct. 5, 1977 in the name of Chodak, now U.S. Pat. No. 4,125,775, is based around a 150 watt xenon arc source fitted with a filter to modify the spectral output thereof so as to closely approach the solar spectrum, particularly in the ultraviolet, blue, and red portions. The infrared region of the spectrum is attenuated with a layer of water of sufficient thickness to provide equal irradiance to that of the sun, but with no special regard for the spectral distribution within that region.

The intensity of the arc source was adjusted such that the amount of darkening resulting from exposure to the light source was essentially identical to that of a number of commercially available photochromic glasses, including PHOTOGRAY ® lenses, darkened outdoors at noon during a cloudless early summer day in Corning, New York (air mass value of about 1.06). Numerous experimental photochromic glasses of widely-variant compositions were also subjected to the solar simulator and to outdoor sunlight. Good overall agreement was observed in comparisons between the two types of measurements.

In order to continuously monitor the darkened transmittance of the specimens, each sample was interrogated with a chopped beam of light from a tungsten-halogen lamp detected by a PIN silicon photodiode whose output was demodulated via a lock-in amplifier. A composite color filter was placed into the beam so that the product of the light's spectral output, the silicon detector spectral sensitivity, and the filter transmittance would closely approximate the spectral sensitivity of the human eye.

This apparatus was interfaced to a PDP-11/04 computer (marketed by Digital Equipment Corporation, Maynard, Massachusetts) to enable automatic sample change, temperature selection, event sequencing, and data collection, storage, reduction, and retrieval with a minimum of operator's involvement.

The exposure of three commercially-available photochromic glass samples to the solar simulator gave the following average values recited below. Approximate analyses in weight percent for each glass are also reported. The glasses marketed under the names PHOTOGRAY ® and PHOTOVITAR were measured in 2 mm thickness and exhibited clear luminous transmittance of about 90-92%, whereas the glass marketed under the name SUNSITIVE ™ is a sunglass product produced from 1.5 mm thick sheet. That glass demonstrated a clear luminous transmittance of about 70-72%. $Y_D$ designates the darkened transmittance and $Y_{F5}$ represents the transmittance of the sample five minutes after removal from exposure to the solar simulator source.

| | PHOTOGRAY ® | PHOTOVITAR | SUNSITIVE ™ |
|---|---|---|---|
| $SiO_2$ | 55.6 | 54.0 | 58.2 |
| $B_2O_3$ | 16.4 | 16.5 | 17.5 |
| $Al_2O_3$ | 8.9 | 8.9 | 11.5 |
| $Li_2O$ | 2.65 | 2.37 | 2.0 |
| $Na_2O$ | 1.85 | 1.88 | 6.7 |
| $K_2O$ | 0.01 | — | 1.5 |
| BaO | 6.7 | 9.7 | — |
| CaO | 0.2 | — | — |
| PbO | 5.0 | 0.6 | 2.2 |
| $ZrO_2$ | 2.2 | 1.9 | — |
| Ag | 0.16 | 0.14 | 0.18 |
| CuO | 0.035 | 0.015 | 0.018 |
| Cl | 0.24 | 0.59 | 0.24 |

-continued

| PHOTOGRAY® | | | | PHOTOVITAR | | | | SUNSITIVE™ | | | |
|---|---|---|---|---|---|---|---|---|---|---|---|
| Br | 0.145 | | | | 0.18 | | | | 0.10 | | |
| F | 0.19 | | | | 0.19 | | | | 0.23 | | |
| MgO | — | | | | 2.42 | | | | — | | |
| Exposure Temperature | Exposure Time | $Y_D$ | $Y_{F5}$ | Exposure Temperature | Exposure Time | $Y_D$ | $Y_{F5}$ | Exposure Temperature | Exposure Time | $Y_D$ | $Y_{F5}$ |
| 40° C. | 20 min. | 58.5% | 76.5% | 40° C. | 20 min. | 62% | 86% | 40° C. | 20 min. | 32% | 51% |
| 20° C. | 20 min. | 47% | 61% | 20° C. | 30 min. | 41% | 70% | 20° C. | 30 min. | 21% | 31% |
| 0° C. | 20 min. | 37.5% | 47.5% | 0° C. | 30 min. | 23.5% | 46.5% | 0° C. | 30 min. | 15% | 19% |
| −18° C. | 20 min. | 31.5% | 37.5% | −18° C. | 60 min. | 13% | 22% | −18° C. | 60 min. | 14% | 16% |

Several general conclusions can be reached from a study of the above data. First, each glass darkens to a lower transmittance when the temperature of exposure is lower. The PHOTOVITAR glass does not darken to a very great extent at high ambient temperatures, but darkens to low levels at low temperatures. The PHOTOVITAR glass displays more rapid fading than either of the other two specimens, but none of the glasses fades rapidly at low temperatures. This sluggishness in fade rate at low temperatures, however, may not be of substantial practical significance since, in many instances, the glass will be warming up during the fading process. For example, the wearer of ophthalmic lenses will be coming indoors from being outside on a cold day and, as can be observed from the above data, the fade rate increases as the temperature rises.

TABLE II

| Example | $Y_o$ | $Y_{D20}$ | $Y_{D60}$ | $Y_{F5}$ | $Y_{F60}$ | $Y_{F\,overnight}$ | $Y_{F60}/Y_o$ |
|---|---|---|---|---|---|---|---|
| 5 | 69% | 22% | 20% | 45% | 65% | 67.3% | 94% |
| 7 | 89% | 28% | 26% | 60% | 83% | 86.5% | 93% |

The best possible fade rates can be achieved in those compositions where PbO is present but at low values. Thus, glasses displaying the most rapid fading rates, i.e., glasses wherein the luminous transmittance after five minutes of fading at 25°–30° C. can exceed 2.25 times the transmittance in the darkened state, have compositions consisting essentially, in weight percent on the oxide basis as calculated from the batch, of about 57.1–65.3% $SiO_2$, 9.6–13.9% $Al_2O_3$, 12.0–22.0% $B_2O_3$,

TABLE I

| | 1 | 2 | 3 | 4 | 5 | 6 | 7 | 8 | 9 | 10 | 11 |
|---|---|---|---|---|---|---|---|---|---|---|---|
| $SiO_2$ | 60.4 | 60.4 | 60.4 | 60.4 | 60.4 | 60.4 | 60.4 | 60.3 | 59.7 | 60.4 | 60.4 |
| $B_2O_3$ | 17.7 | 17.7 | 17.7 | 17.7 | 17.7 | 17.7 | 17.7 | 17.7 | 17.9 | 17.7 | 17.7 |
| $Al_2O_3$ | 11.8 | 11.8 | 11.8 | 11.8 | 11.8 | 11.8 | 11.8 | 11.8 | 11.5 | 11.8 | 11.8 |
| $Li_2O$ | 2.1 | 2.1 | 2.1 | 2.1 | 2.1 | 2.1 | 2.1 | 2.1 | 2.1 | 2.1 | 2.1 |
| $Na_2O$ | 5.9 | 5.9 | 5.9 | 5.9 | 5.9 | 5.9 | 5.9 | 5.9 | 5.9 | 6.3 | 5.9 |
| $K_2O$ | 1.6 | 1.6 | 1.6 | 1.6 | 1.6 | 1.6 | 1.6 | 1.6 | 1.6 | 1.6 | 1.6 |
| PbO | 0.25 | 0.25 | 0.25 | 0.25 | 0.28 | 0.28 | 0.28 | 0.40 | 1.0 | 0.25 | 0.25 |
| NiO | 0.040 | 0.077 | 0.120 | 0.077 | 0.077 | 0.185 | — | 0.077 | — | 0.077 | — |
| $Co_3O_4$ | 0.015 | 0.029 | 0.046 | 0.029 | 0.029 | 0.013 | — | 0.029 | — | 0.029 | — |
| Ag | 0.24/0.17 | 0.24/0.17 | 0.24/0.17 | 0.24/0.17 | 0.22/0.15 | 0.22/0.15 | 0.22/0.15 | 0.25/0.15 | 0.24/0.15 | 0.24/0.16 | 0.24/0.14 |
| Cl | 0.66/0.47 | 0.66/0.47 | 0.66/0.47 | 0.66/0.48 | 0.73/0.47 | 0.73/0.49 | 0.73/0.48 | 0.67/0.38 | 0.36/0.27 | 0.66/0.40 | 0.66/0.39 |
| Br | 0.20/0.10 | 0.20/0.10 | 0.20/0.10 | 0.20/0.09 | 0.26/0.09 | 0.26/0.10 | 0.26/0.10 | 0.19/0.10 | 0.21/0.12 | 0.21/0.11 | 0.21/0.09 |
| CuO | 0.006 | 0.006 | 0.006 | 0.006 | 0.0065 | 0.0065 | 0.0065 | 0.006 | 0.010 | 0.006 | 0.006 |
| F | 0.22 | 0.22 | 0.22 | — | 0.22 | 0.22 | 0.22 | 0.23 | 0.23 | 0.23 | 0.23 |
| Measurements at 27° C. | | | | | | | | | | | |
| $Y_o$ | 80% | 70% | 60% | 70% | 70% | 70% | 89% | 70% | 88% | 70% | 88% |
| $Y_{D10}$ | 29 | 26 | 22 | 27 | 27 | 27 | 30 | 26 | 28 | 26 | 29 |
| $Y_{F5}$ | 63 | 56 | 48 | 56 | 55 | 55 | 64 | 54 | 59 | 55 | 61 |
| Measurements at 40° C. | | | | | | | | | | | |
| $Y_o$ | 80% | 70% | 60% | 70% | 70% | 70% | 89% | 70% | 88% | 70% | 88% |
| $Y_{D20}$ | 47 | 41 | 35 | 46 | 35 | 35 | 50 | 43 | 43 | 43 | 45 |
| Measurements at −18° C. | | | | | | | | | | | |
| $Y_o$ | 80% | 70% | 60% | 70% | 70% | 70% | 89% | 70% | 88% | 70% | 88% |
| $Y_{D20}$ | 25 | 21 | 18 | 26 | 23 | 23 | 29 | 21 | 23 | 21 | 30 |

Table II illustrates the completeness of fade or the long term fading characteristics of Examples 5 and 7 of Table I when measured at 27° C. in 1.5 mm thickness. $Y_o$ represents the clear luminous transmittance, $Y_{D20}$ and $Y_{D60}$ designate the darkened transmittance after exposures of 20 minutes and 60 minutes, respectively, to the solar simulator source, $Y_{F5}$, $Y_{F60}$, and $Y_F$ overnight, indicate the transmittance after five minutes, 60 minutes, and an overnight (~8 hours), respectively, removal from the solar simulator source, and $Y_{F60}/Y_o$ reflects the percentage to which the glass has faded after 60 minutes with respect to the original luminous transmittance.

1.0–3.5% $Li_2O$, 3.7–12.0% $Na_2O$, 0–5.8% $K_2O$, 6–15% total of $Li_2O+Na_2O+K_2O$, the molar ratio $Li_2O$:$Na_2O+K_2O$ not exceeding about 2:3, 0.15–0.7% PbO, 0.10–0.30% Ag, 0.2–1.0% Cl, 0–0.30% Br, 0.002–0.02% CuO, 0–2.5% F, 0–1.0% total of transition metal oxides selected in the indicated proportions from the group consisting of 0–0.5% CoO, 0–1.0% NiO, and 0–1.0% $Cr_2O_3$, and 0–5.0% total of rare earth metal oxides selected from the group consisting of $Er_2O_3$, $Pr_2O_3$, $Ho_2O_3$, and $Nd_2O_3$.

Glasses manifesting similar excellent fading rates which can be drawn as sheet and the sheet than simultaneously sagged to yield lenses of desired curvatures and photochromic properties developed therein, as has been described above, have compositions falling within the same ranges set out immediately above except for the Ag and Br contents. Those constituents, as analyzed in the glass, will vary as 0.12-0.18% Ag and 0.06-0.13% Br.

The photochromic properties of the drawn sheet are self-evidently affected to some degree by the heat treatment employed to develop those properties. This situation is particularly true when the temperature ranges of treatment is strictly limited because of the requirements of the simultaneous heat treating-sagging process. However, those properties are also critically dependent upon the composition of the glass. Thus, changes in essentially any of the glass components will result in modifications of the photochromic behavior. For example, not only will variations in the "photochromic elements", i.e., silver, the halides, and copper oxide, alter the photochromic characteristics of a glass, but also, albeit to a lesser extent, will changes in the levels of alkali metal oxide, $SiO_2$, $B_2O_3$, and PbO.

Table III lists several exemplary glass compositions in parts by weight within the scope of U.S. Pat. No. 4,018,965, but outside the scope of the instant invention, which demonstrate poor fading characteristics. This failure is attributed to compositional differences. In addition, sheet of Example B cannot be simultaneously heat treated to develop desired photochromic properties while being sagged into lenses having curvatures of 4-6 diopters. The concentrations of the glass ingredients are delineated in parts by weight on the oxide basis as calculated from the batch for each glass, except for silver and the halides which are recorded on the elemental basis. Batch amounts of Ag, Cl, and Br are recited to the left of the slash marks and analyzed values to the right. The glasses can be compounded and melted in like manner to the description underlying Table I. The working examples 1-6 reported in Table I of U.S. Pat. No. 4,018,965 can serve as additional glass compositions outside the scope of the instant inventive glasses, again displaying poor fading characteristics.

TABLE III

|  | A | B | C |
| --- | --- | --- | --- |
| $SiO_2$ | 59.1 | 59.1 | 58.2 |
| $B_2O_3$ | 17.5 | 17.5 | 17.5 |
| $Al_2O_3$ | 11.5 | 11.5 | 11.5 |
| $Li_2O$ | 2.0 | 2.0 | 2.0 |
| $Na_2O$ | 7.7 | 7.7 | 6.7 |
| $K_2O$ | — | — | 1.5 |
| PbO | 2.2 | 2.2 | 2.2 |
| Ag | 0.23/0.18 | 0.27/0.22 | 0.23/0.18 |
| Cl | 0.37/0.35 | 0.37/0.35 | 0.26/0.24 |
| Br | 0.15/0.12 | 0.22/0.19 | 0.14/0.10 |
| CuO | 0.023 | 0.023 | 0.018 |
| F | 0.23 | 0.23 | 0.23 |

Table IV reports further exemplary glass compositions in parts by weight, the glasses being within the broad purview of the instant invention but outside of the preferred ranges of compositions. That is, the glasses demonstrate the desired photochromic properties, but cannot utilize the same heat treatment to develop photochromic behavior while sagging sheet to desired lens curvatures. Again, batch quantities of Ag, Cl, and Br are recited to the left of the slash mark and analyzed values to the right.

TABLE IV

|  | 12 | 13 | 14 | 15 | 16 | 17 |
| --- | --- | --- | --- | --- | --- | --- |
| $SiO_2$ | 60.4 | 60.4 | 60.4 | 60.4 | 62.0 | 59.3 |
| $B_2O_3$ | 17.7 | 17.7 | 17.7 | 17.7 | 16.7 | 17.8 |
| $Al_2O_3$ | 11.8 | 11.8 | 11.8 | 11.8 | 9.4 | 11.4 |
| $Li_2O$ | 2.1 | 2.1 | 2.1 | 2.1 | 1.9 | 2.1 |
| $Na_2O$ | 5.9 | 5.9 | 5.9 | 5.9 | 3.8 | 5.8 |
| $K_2O$ | 1.6 | 1.6 | 1.6 | 1.6 | 4.9 | 1.6 |
| PbO | 0.25 | 0.25 | 0.25 | 0.25 | 0.5 | 1.0 |
| Ag | 0.11/0.08 | 0.31/0.20 | 0.31/0.20 | 0.25/0.22 | 0.30/0.20 | 0.25/0.21 |
| Cl | 0.66/0.39 | 0.67/0.39 | 0.37/0.22 | 0.35/0.31 | 0.30/0.19 | 0.35/0.31 |
| Br | 0.20/0.11 | 0.20/0.09 | 0.19/0.11 | 0.15/0.11 | 0.20/0.12 | 0.20/0.12 |
| CuO | 0.006 | 0.006 | 0.006 | 0.005 | 0.012 | 0.010 |
| F | 0.23 | 0.23 | 0.23 | 0.22 | — | 0.22 |

It is believed that the amount of Ag is too low in Example 12 and too high in Examples 13-17.

The optional addition of the above-described transition metal oxide and rare earth metal oxide colorants to the glass compositions of the instant invention can be useful in securing some light attenuation and coloration in the faded state, customarily for cosmetic purposes, and also to provide some coloration and attenuation in the darkened state. Nevertheless, caution must be exercised in selecting colorants for these photochromic glasses because the effectiveness of multivalent colorant ions is frequently strongly dependent upon the oxidation state of the glass. Furthermore, some colorants absorb ultraviolet radiation, thereby reducing the darkening potential of the glass. For these reasons the foregoing recited transition metal and rare earth metal colorants are preferred. Nonetheless, minor amounts of additional colloidal or ionic colorants such as uranium, cadmium sulfide, cadmium selenide, metallic gold, or the like can be included provided such additions do not deleteriously affect the photochromic properties of the glass.

Table V records specific examples of tinted glass compositions falling within the scope of the instant invention illustrating the use of several of the preferred colorants and the colors induced thereby. The base composition for each example was Example 8 of Table I such that only the concentrations of the colorants, in parts by weight, are tabulated. The corresponding melting practices utilized with the glasses of Table I were also employed here.

TABLE V

|  | 18 | 19 | 20 | 21 | 22 | 23 | 24 | 25 | 26 | 27 |
| --- | --- | --- | --- | --- | --- | --- | --- | --- | --- | --- |
| CoO | 0.03 | 0.03 | 0.04 | 0.02 | 0.01 | — | — | — | — | — |
| NiO | 0.08 | 0.04 | 0.03 | 0.11 | 0.15 | 0.17 | — | — | — | — |
| $Cr_2O_3$ | — | — | — | — | — | — | 0.01 | — | — | — |
| $Er_2O_3$ | — | — | — | — | — | — | — | 0.5 | — | — |
| $Pr_2O_3$ | — | — | — | — | — | — | — | — | 0.5 | — |
| $Nd_2O_3$ | — | — | — | — | — | — | — | — | — | 0.5 |
|  | Neutral Gray | Blue-Gray | Blue | Green-Brown | Brown | Yellow-Brown | Green | Light-Pink | Light Green | Light Blue |

To aid in further understanding the production practice for fabricating drawn sheet glass articles in accordance with the instant invention, the following working example is provided.

EXAMPLE

A glass batch was compounded and melted at a temperature of about 1400° C., the batch having a composition, in parts by weight, of about 60.4 $SiO_2$, 17.7 $B_2O_3$, 11.8 $Al_2O_3$, 5.9 $Na_2O$, 1.6 $K_2O$, 2.1 $Li_2O$, 0.28 PbO, 0.25 Ag, 0.66 Cl, 0.20 Br, 0.23 F, and 0.005 CuO. The molten glass was fed into a refractory overflow downdraw fusion pipe at a viscosity of about $10^4$ poises and delivered from the pipe as drawn sheet about 1.5 mm in thickness. The drawn sheet was cooled below the glass softening point and separated into sections of sheet glass from which small samples of desired geometries were cut. (Analyzed Ag=0.16%, Br=1.10%.)

The sheet glass samples were then exposed to a heat treatment to develop photochromic properties therein, the heat treatment comprising heating the samples in a lehr, in a manner such as is described in U.S. application Ser. No. 773,958, supra, that is, edge supported on alveolated molds to prevent surface damage thereto, at a rate of about 600° C./hour to 640° C. holding that temperature for 10 minutes to sag the glass into the concave portions of the alveolated molds, cooling the samples at 600° C./hour to at least below 450° C., and then removing the samples from the lehr.

The photochromic glass samples were then subjected to a chemical strengthening treatment which involved immersing the samples into a bath of molten $NaNO_3$ operating at 410° C. for 16 hours. The samples were thereafter removed from the bath, cooled, the excess salt washed off with tap water, and tested for strength and photochromic properties.

Modulus of rupture values in excess of 45,000 psi were determined and the depth of the surface compression layers was observed to vary between about 0.0035-0.004''.

The fully faded luminous transmittance of a typical 1.5 mm thick photochromic drawn sheet glass article produced in the manner described above is about 90%. After exposure for 60 minutes to the solar simulator source at 25° C., a darkened luminous transmittance of about 26% is measured. After a five-minute withdrawal from the solar simulator source, the glass commonly fades about 34 luminous percentage units to a transmittance of about 60%. The glass will fade to a luminous transmittance of about 83% after one hour, this value being about 92% of the original transmittance.

Upon exposure to the solar simulator source for 60 minutes at 40° C., a darkened luminous transmittance of about 45% is read. At −18° C., a darkened luminous transmittance of about 22% is measured after a 60-minute exposure.

The foregoing example, which is merely illustrative and not limitative of the various compositions and procedures operable in the instant invention, clearly demonstrates the effectiveness of the inventive compositions in producing strengthened photochromic drawn sheet glass articles exhibiting the necessary properties for ophthalmic and other applications.

We claim:

1. A method for forming glass sheet from potentially photochromic glass and thereafter simultaneously shaping articles from said glass sheet and developing photochromic properties therein which comprises the steps of:

(a) melting a batch for a glass consisting essentially, in weight percent on the oxide basis, of about 57.1-65.3% $SiO_2$, 9.6-13.9% $Al_2O_3$, 12-22% $B_2O_3$, 1-3.5% $Li_2O$, 3.7-12% $Na_2O$, 0-5.8% $K_2O$, 6-15% total of $Li_2O+Na_2O+K_2O$, the molar ratio $Li_2O:Na_2O+K_2+K_2O$ not exceeding 2:3, 0.15-0.7% PbO, 0.12-0.18% Ag, 0.2-1% Cl, 0.06-0.13% Br, 0-2.5% F, and 0.002-0.02% CuO, the Ag, Cl, and Br ranges representing values as analyzed in the glass;

(b) adjusting the temperature of at least one region of the glass melt to provide a viscosity therein of about $10^4$-$10^6$ poises;

(c) drawing the glass melt at a viscosity of about $10^4$-$10^6$ poises directly past platinum or platinum-clad refractory forming means to produce potentially photochromic drawn glass sheet of optical quality, said glass exhibiting good resistance to surface crystal growth in contact with platinum such that over a contact period of 30 days the growth of a crystalline layer will not exceed 10 microns in thickness;

(d) cooling the glass sheet below the softening point of the glass and cutting articles of desired geometries therefrom;

(e) edge supporting said articles on alveolated molds; and then (f) heating said articles at a temperature between about 610°-660° C. for a period of time sufficient to simultaneously sag the glass to a desired curvature into the concave portions of the alveolated molds, but not into contact with the inner surface of said molds, and develop photochromic properties in the glass.

2. A method according to claim 1 wherein said time sufficient to simultaneously sag the glass and develop photochromic properties therein ranges from about 6-15 minutes at temperatures between 610°-640° C. or from about 5-12 minutes at temperatures between 640°-660° C.

3. A method according to claim 1 wherein said batch also contains up to 1% total of transition metal oxides and/or up to 5% total of rare earth metal oxides as colorants.

4. A method according to claim 3 wherein said transition metal oxides are selected in the indicated proportions from the group consisting of 0-0.5% CoO, 0-1.0% NiO, and 0-1.0% $Cr_2O_3$, and said rare earth metal oxides are selected from the group consisting of $Er_2O_3$, $Ho_2O_3$, $Nd_2O_3$, and $Pr_2O_3$.

* * * * *

UNITED STATES PATENT AND TRADEMARK OFFICE
CERTIFICATE OF CORRECTION

PATENT NO. : 4,282,021

DATED : August 4, 1981

INVENTOR(S) : Jean P. Mazeau and Thomas P. Seward, III

It is certified that error appears in the above-identified patent and that said Letters Patent are hereby corrected as shown below:

Column 12, line 66, "than" should read -- then --

Column 13, line 9, "ranges" should read -- range --.

Column 16, line 14, "+$K_2$" first occurrence should be omitted.

Signed and Sealed this

Twenty-sixth Day of January 1982

[SEAL]

Attest:

GERALD J. MOSSINGHOFF

Attesting Officer

Commissioner of Patents and Trademarks